(12) United States Patent
Runyan

(10) Patent No.: US 8,347,440 B1
(45) Date of Patent: Jan. 8, 2013

(54) RETRACTABLE TRAILER RAMPS

(76) Inventor: Clayton Chance Runyan, Mill Creek, OK (US)

( * ) Notice: Subject to any disclaimer, the term of this patent is extended or adjusted under 35 U.S.C. 154(b) by 0 days.

(21) Appl. No.: 13/135,488

(22) Filed: Jul. 7, 2011

(51) Int. Cl.
*E01D 1/00* (2006.01)
(52) U.S. Cl. .......................................... 14/71.1
(58) Field of Classification Search ............... 296/61; 414/537; 14/71.1
See application file for complete search history.

(56) References Cited

U.S. PATENT DOCUMENTS

| | | | |
|---|---|---|---|
| 2,559,712 A | 7/1951 | Dobbs | |
| 3,288,522 A * | 11/1966 | Norton | 296/61 |
| 3,319,811 A * | 5/1967 | Martin, Jr. | 414/537 |
| 3,972,428 A | 8/1976 | Love, Jr. | |
| 4,966,516 A * | 10/1990 | Vartanian | 414/537 |
| 4,995,129 A | 2/1991 | Comardo | |
| 5,035,565 A | 7/1991 | White | |
| 5,085,555 A * | 2/1992 | Vartanian | 414/537 |
| 5,211,437 A | 5/1993 | Gerulf | |
| 5,215,426 A | 6/1993 | Bills, Jr. | |
| 5,287,579 A * | 2/1994 | Estevez, Jr | 14/71.1 |
| 5,536,058 A | 7/1996 | Otis | |
| 5,538,307 A * | 7/1996 | Otis | 296/61 |
| 5,540,474 A | 7/1996 | Holland | |
| 5,678,984 A | 10/1997 | Peterson | |
| 7,344,184 B2 | 3/2008 | Salvador | |
| 7,549,692 B2 | 6/2009 | Washington | |
| 7,677,626 B2 * | 3/2010 | Hanzel | 296/26.11 |
| 2003/0015885 A1 * | 1/2003 | Landwehr | 296/61 |

* cited by examiner

*Primary Examiner* — Thomas B Will
*Assistant Examiner* — Abigail A Risic
(74) *Attorney, Agent, or Firm* — Randal D. Homburg

(57) ABSTRACT

A pair of integrated ramps attach to the rear of a trailer or utility cargo bed, the ramps swinging on a horizontal plane from a stored position and then being rotated to form a pair or flat ramps surfaces in a flat position, the ramps sliding along the rear end of a trailer on a secure end railing. The sliding railing provides adjustment to the width of the ramps for the purpose of off loading cargo carried upon the cargo surface of the trailer, the ramps forming a stable angled surface between the cargo bed and the ground. The ramps may form a tailgate in a stored position or be made part of the side rails for the trailer in the stored position.

10 Claims, 5 Drawing Sheets

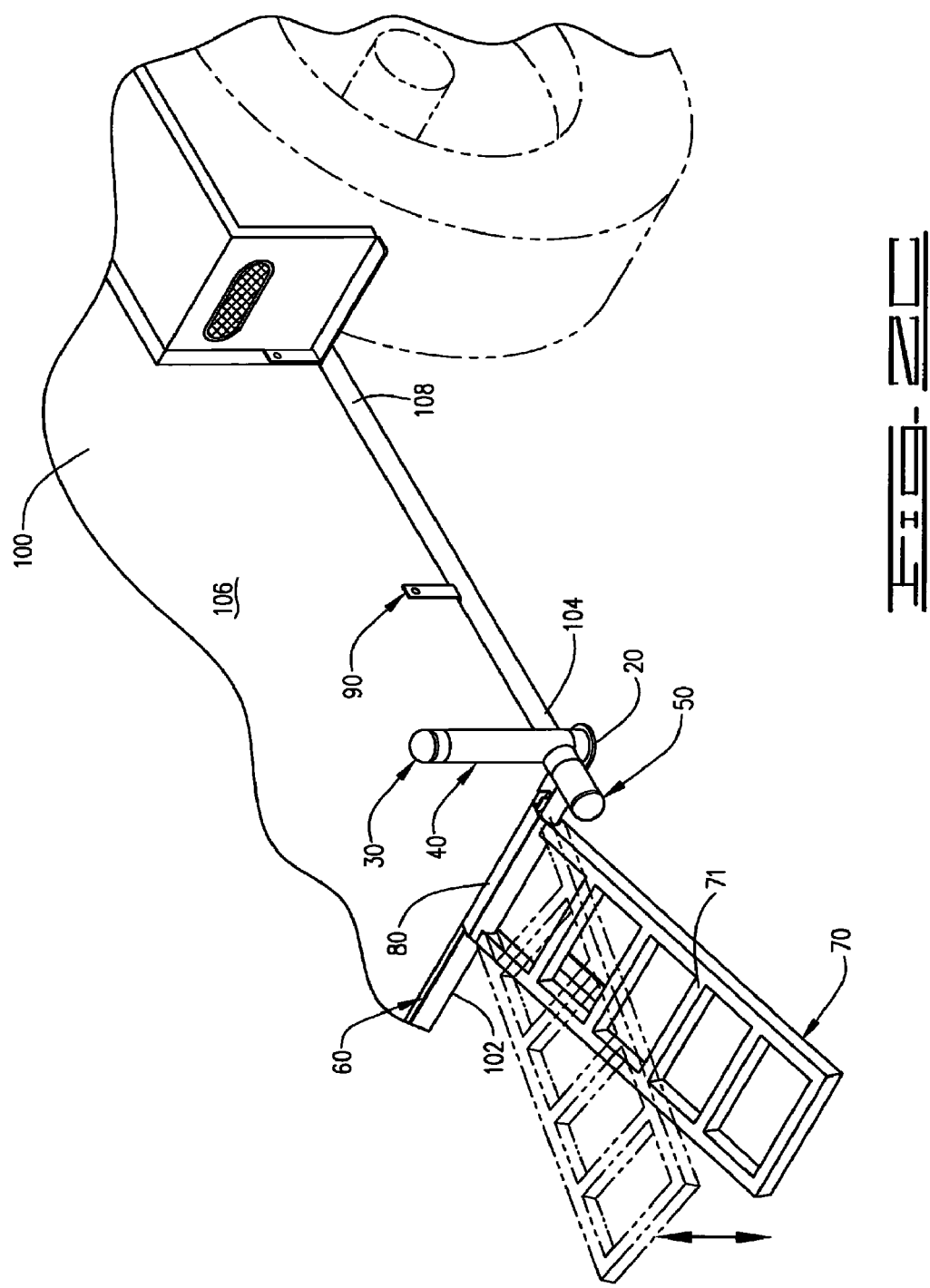

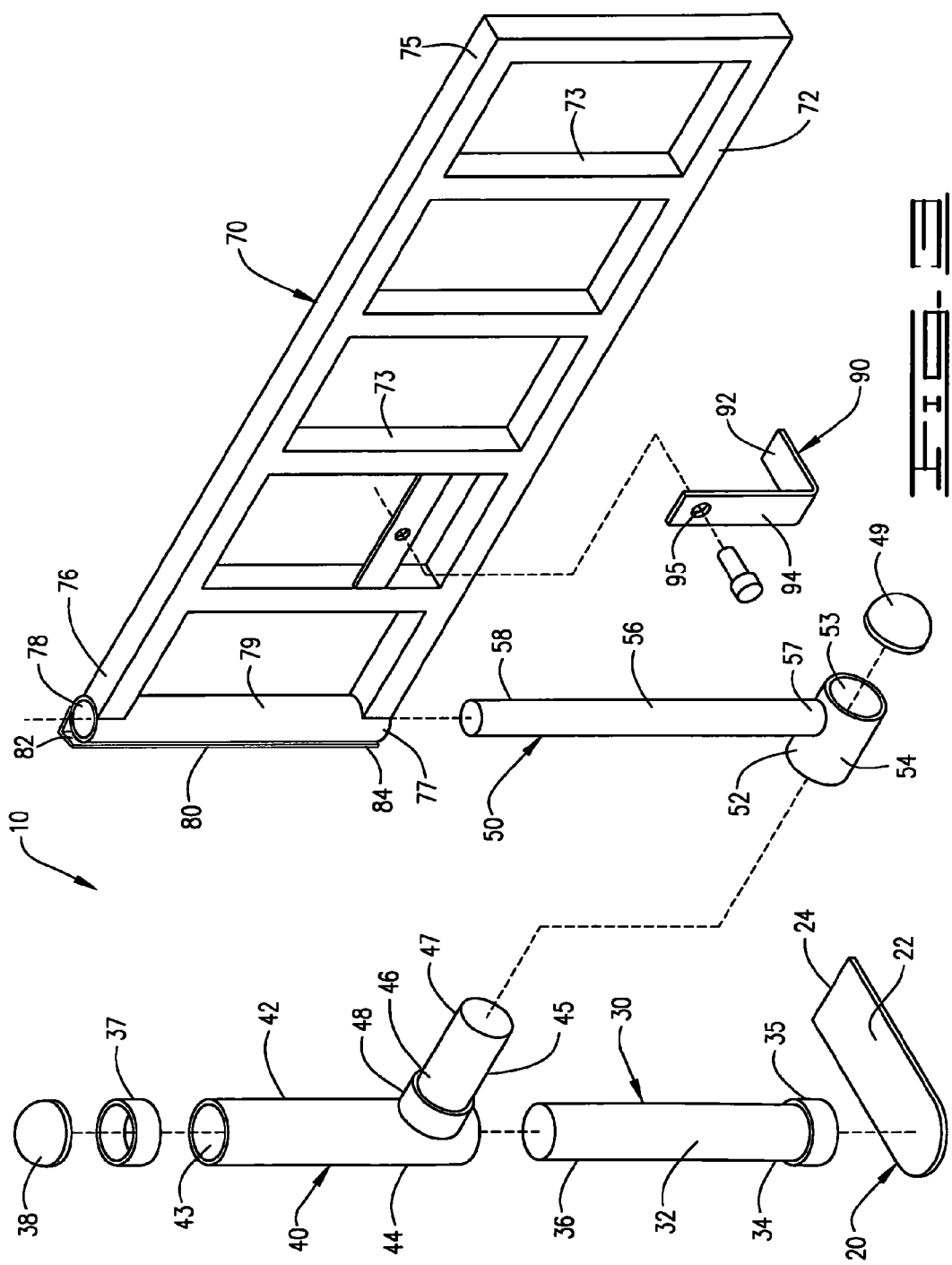

RETRACTABLE TRAILER RAMPS

CROSS REFERENCE TO RELATED APPLICATIONS

None.

I. BACKGROUND OF THE INVENTION

1. Field of Invention

A pair of integrated ramps attach to the rear of a trailer or utility cargo bed, the ramps swinging on a horizontal plane from a stored position and then being rotated to form a pair or flat ramps surfaces which slide along the rear end of a trailer on a secure end railing to adjust the width of the ramps for the purpose of off loading cargo carried upon the cargo surface of the trailer, the ramps forming a stable angled surface between the cargo bed and the ground.

2. Description of Prior Art

A preliminary review of prior art patents was conducted by the applicant which reveal prior art patents in a similar field or having similar use. However, the prior art inventions do not disclose the same or similar elements as the present trailer ramps, nor do they present the material components in a manner contemplated or anticipated in the prior art.

Several ramps are intended for use for pickup tailgates, but could be readily adapted to a trailer, since a trailer end and a pickup tailgate are relatively similar. These type prior art patents either attach to the tailgate or emanate from the tailgate. In U.S. Pat. No. 7,549,692 to Washington, a pair of telescoping ramps extend from within a tailgate and telescopically side out to form a ramp with a trough which may be pivotally lowered to the ground forming the ramp between the pickup bed and the ground. A near identical set of ramps is disclosed in U.S. Pat. No. 5,536,058 to Otis. Sliding ramps stored within the pickup bed side panels have an upper lip which slip into a tailgate groove providing the ramps at adjustable widths in U.S. Pat. No. 7,344,184 to Salvador. In U.S. Pat. No. 5,540,474 to Holland, a set of folding panel ramps which attach to the tailgate by clamping means, attach to the tailgate and then the panels are folded from one another forming the extension ramp being two axial panels with a central hinge.

A bracket made of a heavy angle iron strip, a pair of spaced bolster embracing plates and having an end welded to the inside of the angle iron and three pivot ears welded to the outside surface of one flange of the angle iron attach to the bed of a vehicle and provide a location for the placement of a ramp which may be pivotally extended to the ground forming an angled surface between the ground and the loading bed in U.S. Pat. No. 2,559,712 to Dobbs.

Truck beds also provide for several varieties of interactive ramps. In U.S. Pat. No. 5,035,565 to White, a pair of ramps are attached to the rear end the bed of the vehicle and have lowered extension which are inserted within slotted members at the rear end to provide the ramps at an angle between the ground and the loading surface. In U.S. Pat. No. 5,678,984 to Peterson, a detachable folding panel ramp attaches to the back of a flatbed tractor trailer with hydraulic piston to raise and lower the ramp and also to fold the ramp into upon itself.

A combination tailgate and ramp assembly is disclosed in U.S. Pat. No. 5,211,437 to Gerulf, which provides a pair of ramps which, when fastened together with fastener brackets form a conventional tailgate, hinged and rotatable about a transverse side rails. These ramps are lowered like a tailgate with outside fastening brackets lowered from below the outside edges of the ramps and the ramps are then separated outward on the pivotal swing pins attaching the outer top edges to a slide rail. Each ramp is then rotated outward while swing pin hinges slide along the slide bar until the swing pin hinges are as far to the respective outside edges of the rail as possible. The outer edges of the flat positioned ramps are then locked within the fastener brackets below and on the outside of each of the ramps, each ramp held along the slide rail by slidable cam spacers to support the free end of the ramp against the slide rail. The swing pins are rotatable along two transverse axis.

Hinge-mounted trailer tailgate ramps are also disclosed in U.S. Pat. No. 3,972,428 to Love, Jr., which involve a pair of tailgate members that attach to the rear end of a trailer by an L-shaped hinge structure. A short end of the hinge structure is attached to a side frame member by a pair of bearings at the rear of the trailer frame, with a long portion being inserted through an upper end of each ramp, with spaced stops holding the upper end of the ramp upon the long end of the hinge structure to prevent sliding of the ramp upon the hinge structure. The ramps are folded out from a tailgate position, rotated and lowered into a ramp position with the exposed terminal end of the long portion of the hinge structure captured within respective hook members at the rear of the trailer. The upper end of the ramp is also supported by fixed support angles welded onto the rear end of the trailer.

II. SUMMARY OF THE INVENTION

Utility trailers are used to haul various loads behind a towing vehicle. These utility trailers are provided in various sizes and for various purposes, both commercial and individual, hauling objects heavy equipment, recreational vehicles, tractors, furniture, livestock and any other object that requires transport. The load surface of a trailer, being above the ground, often requires the use of ramps to load and unload the cargo from the trailer. Ramps are commercially available, but often constitute additional cargo that must be secured and hauled along with the cargo. These ramps may be difficult to install and uninstall, to locate in place and also to secure for transport. They often weigh more than a single individual can lift by themselves and can cause injury to the person trying to install them. It has been shown in the past that several utility trailers, pickups and other transport vehicles provide for attached ramps that are made part of the trailer or pickup and that deploy and secure in various manners.

The present trailer ramps provide the ramps as integrated trailer components, with the ramps being stowed as part of the side railing of a trailer. They require no additional attachment to the trailer when stowed. When the ramps need to be in use, they are lifted from their securing means, swung around to the rear of the trailer without required further lifting, and then rotated inward, where the upper end of each ramp provides a hooked claw portion that engages a slide railing along the back of the trailer, the ramps then place apart along the back of the trailer at a distance appropriately spaced to the load being off loaded from the trailer, the ramps being adjustable across the width of the rear of the trailer. The ramps are intended for heavy duty load capacity, yet require a far lesser applied force to position and store the ramps than with other prior art ramps or currently available detachable ramps, lowering the risk of injury to the person positioning and stowing the ramps. In addition, the manner with which the ramps are attached to the trailer provide a more secure storage of the ramps, lessened force required to move, stow and deploy prior and current extension ramps, and an adjustable width with far greater stability than other non-detachable or detachable ramp systems.

III. DESCRIPTION OF THE DRAWINGS

The following drawings are submitted with this utility patent application.

FIG. 2C is a perspective view of the cargo ramp section and the right side component segments in the angled ramp position, indicating positioning of the ramp section being raised and lowered in the flat horizontal position during engagement of the ramp slide rail claw with the upright flange of the rear axial slide rail member on the rear end of the cargo bed.

FIG. 3 is a exploded component diagram of one set of component segments of the swinging cargo ramp assembly.

IV. DESCRIPTION OF THE PREFERRED EMBODIMENT

Figure 1:
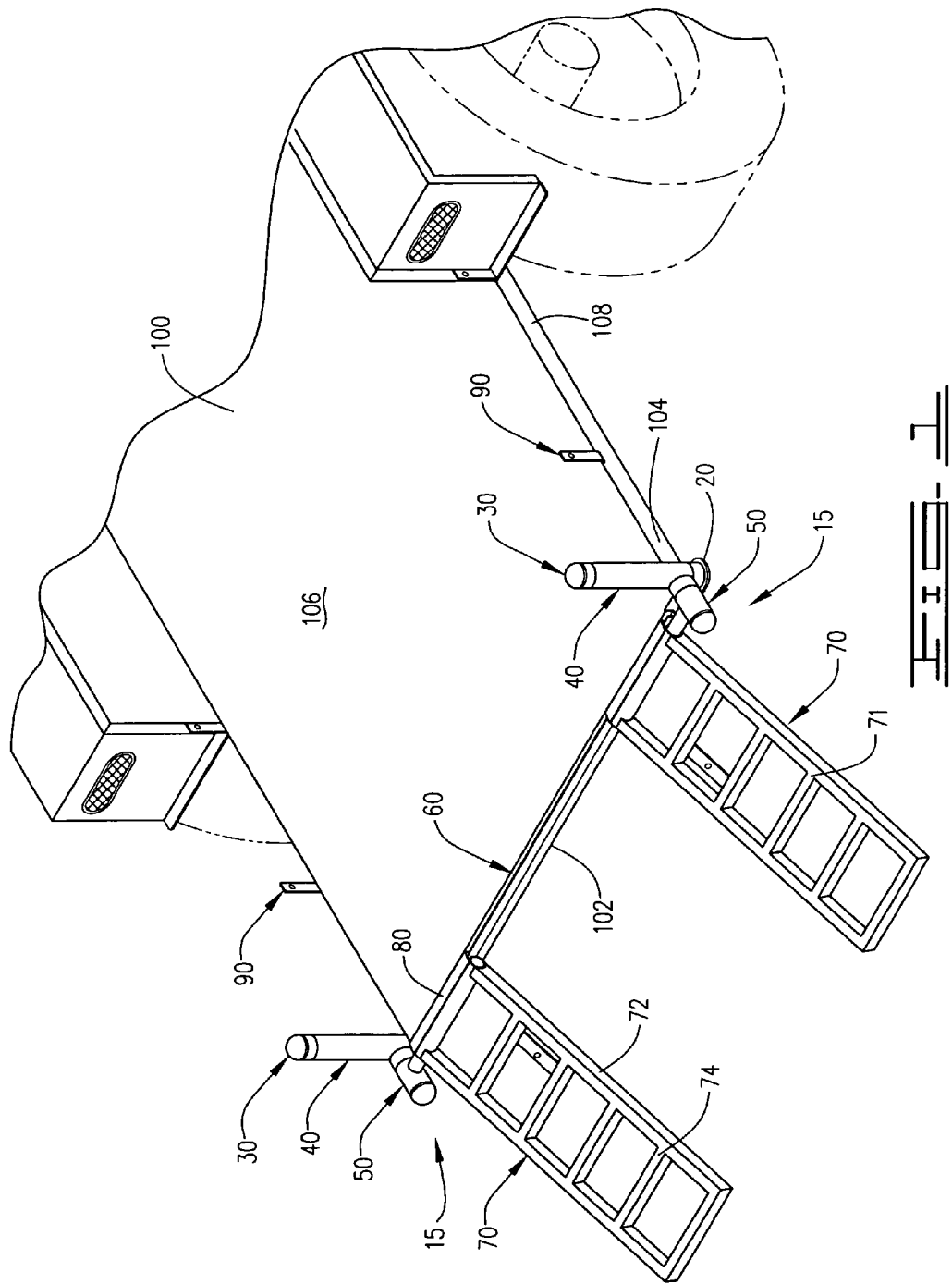
FIG. 1 is an upper perspective of the rear end of a trailer with the swinging cargo ramp assembly in the angled ramp position.
Figure 2A:
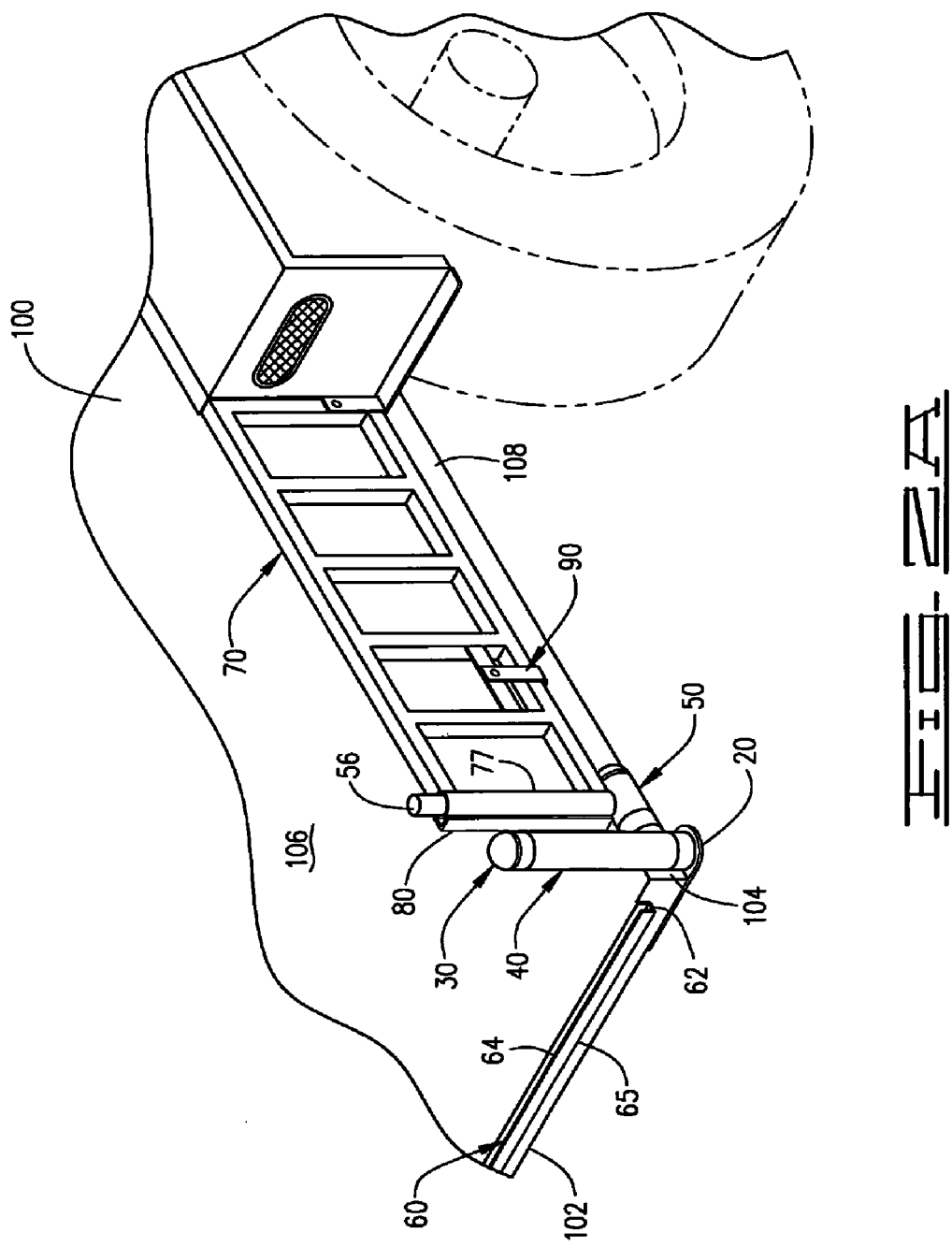
FIG. 2A is an upper perspective view of the right side of the cargo trailer with the swinging cargo ramp assembly in the stored side panel position.
Figure 2B:
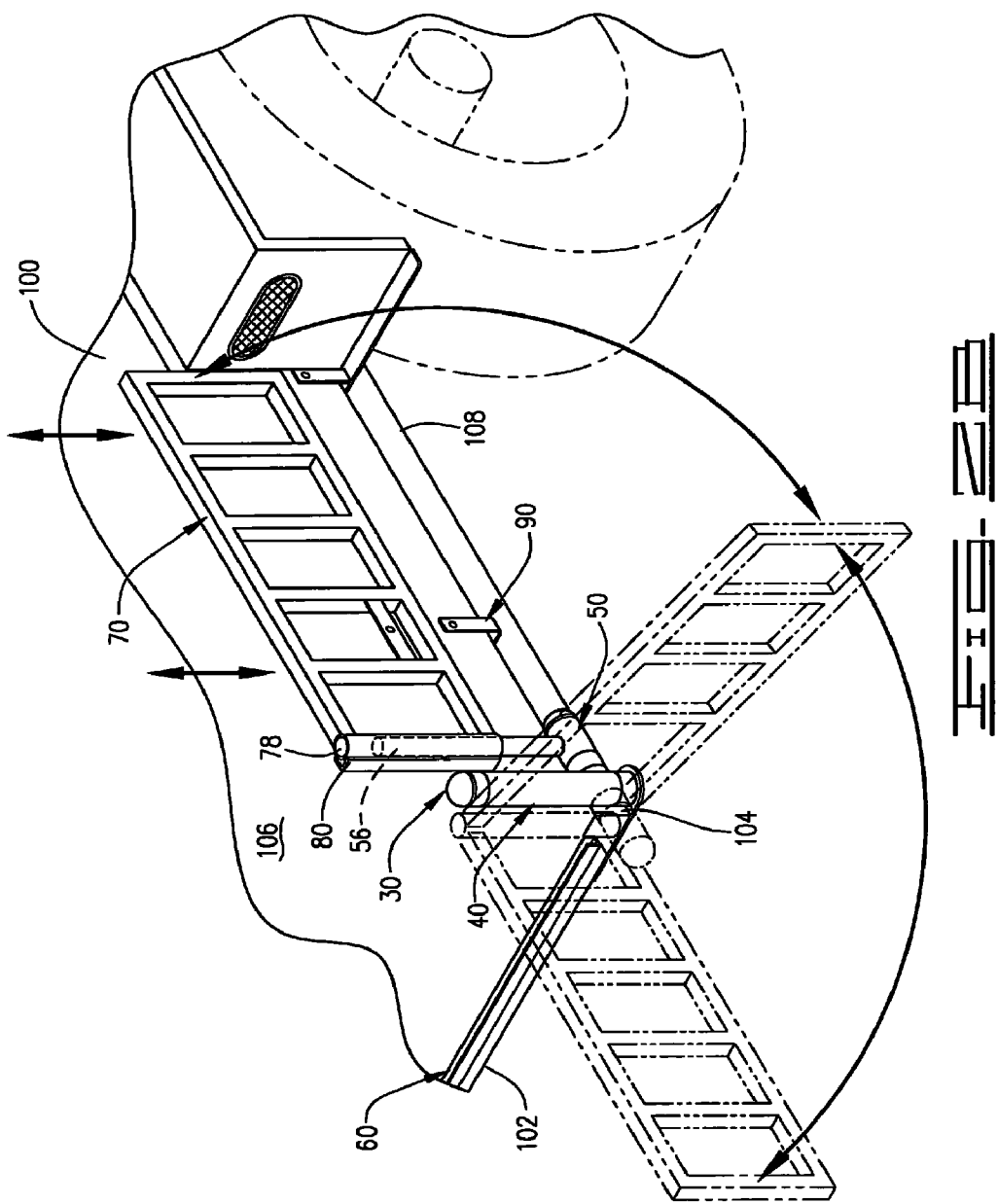
FIG. 2B is a perspective view of the right side cargo ramp section and the right side component segments as the cargo ramp section is moved from the stored side panel position to a rear facing vertical position directed away from the front of the cargo bed, showing the movement of the cargo ramp section on a horizontal axis.

A swinging cargo ramp assembly 10 integrated within a rear end 102 of a cargo bed 100 of a trailer or vehicle, as shown in FIGS. 1-3 of the drawings, providing a pair of pivotally attached adjustable cargo ramp sections 70 independently moved from a stored side panel position, FIG. 2A, to an angled ramp position, FIG. 1, at the rear end 102 of the cargo bed 100, the swinging cargo ramp assembly 10 providing two independently mirror imaged sets of component segments 15, FIG. 3, each of the two sets of component segments 15 comprising a rear trailer tab base 20 defining an upper surface 22 and a tab edge 24 horizontally secured to the rear side frame 104 of the cargo bed 100, a static vertical support member 30 defining a cylindrical vertical shaft 32 having a lower end 34 secured to the upper surface 22 of the tab base 20 and an upper end 36, the lower end 34 providing a lower shaft bearing 35, the upper end 36 providing an upper shaft bearing 37, and an upper shaft cap 38, a horizontal pivot member 40 defining an upright cylindrical collar 42 with a vertical bore 43 pivotally installing upon the vertical shaft 32 of the vertical support member 30 between the upper shaft bearing 37 and the lower shaft bearing 35, the upright cylindrical collar 42 further defining an outer surface 44 from which a first end 46 of a cylindrical lateral pivot extension 45 depends, the lateral pivot extension 45 having a second end 47 providing an extension bearing 48 and an end cap 49, a vertical pivot member 50 defining a cylindrical extension collar 52 with a horizontal bore 53 pivotally engaging the lateral pivot extension 45 of the horizontal pivot member 40 between the extension bearing 48 and the upright cylindrical collar 42, the extension collar 52 further defining an outer surface 54 to which a lower end 57 of a cylindrical ramp shaft extension 56 is attached, the ramp shaft extension 56 terminating at an upper end 58, a rear axial slide rail member 60 providing an upright flange 64 and a base section 62 attached to the rear end 102 of the cargo bed 100 below a floor 106 of the cargo bed 100, and the ramp section 70 providing a rigid angled platform 71 with static support for the intended cargo being loaded and unloaded from the cargo bed 100, most preferably further providing at least two parallel ramp struts 72 supported by a plurality of ramp cross-support members 73 or an optional smooth upper ramp surface 74, while requiring a distal end 75 and a proximal end 76 forming a cylindrical ramp collar 77 having an outer surface 79 and a ramp collar bore 78, the ramp collar bore 78 slidably and pivotally installed upon the ramp shaft extension 56 of the vertical pivot member 50, the ramp collar 77 attaching a ramp extension base 82 of a linear ramp extension 80, the ramp extension 82 further forming a ramp slide rail claw 84 which will engage the upright flange 64 of the axial slide rail member 60 when the ramps 70 are placed into the angled ramp position behind the cargo bed 100. The cargo ramp assembly 10 may further provide a pair of side panel L-shaped brackets 90 attaching to a respective side frame 108 of the cargo bed 100 to independently retain each respective ramp section 70 in the side panel position during transport or non-use of the ramp sections 70 as ramps.

Each ramp section 70, when placed in the angled ramp position with the ramp slide rail claw 84 slidably engaged within the upright flange 64 of the axial slide rail member 60, FIG. 2C, may independently slide along the slide rail 60 while the ramp collar 77 contemporaneously slides in a linear engagement along the ramp shaft extension 56 of the vertical pivot member 50. However, the extension collar 52, while rotatably engaged about the lateral pivot extension 45 of the horizontal pivot member 50, is restricted between the upright cylindrical collar 42 and the extension bearing 48 and end cap 49, restricting any linear movement along the lateral pivot extension 45. Likewise, while the upright cylindrical collar 42 of the horizontal pivot member 40 is rotatably engaged about vertical shaft 32 of the vertical support member 30, linear movement along the vertical shaft 32 is restricted between the upper shaft cap 38, the upper shaft bearing 37 and the lower shaft bearing 35. Therefore, it is the intent of the swinging ramp assembly 10 to restrict engagement between the respective collars and shafts or cylindrical extension to provide only rotational movement without linear sliding with the sole exception to the linear movement restriction being the sliding linear movement capability between the ramp shaft extension 56 and the ramp collar 77. The linear sliding engagement is necessary during contemporaneous sliding engagement between ramp slide rail claw 84 and the upright flange 64 of the axial slide rail member 60 along with the required lateral rotational movement between the side panel position and the ramp position.

The component sections 15 of the swinging cargo ramp assembly 10 must be both weather-resistant and durable and the components should be of suitable construction for the desired load being carried as cargo. This would include a bearing weight range from small garden equipment to heavy equipment, with the components being included accordingly. The assembly can be applied to pickup bed, small or large towed trailers and even heavy duty semi-tractor trailer cargo beds for commercial construction grade heavy equipment. As an example, for heavy equipment, the rear trailer tab base may be provided with additional support components, not shown, by providing enforcement to bear the rotational weight of the other components and the swinging ramp. The static vertical support member 30, the cylindrical lateral pivot extension 45 and the ramp shaft extension 56 would preferably be steel rounded rod, either solid or of sufficient strength to hold their position under the stress of the ramp movement without deformation, the upright cylindrical collar 42 and the extension collar 52 would be steel pipe having an inner dimension slightly larger than the respective shaft 32 or lateral pivot extension 45 and will withstand forces of movement of the components without deformation. The ramp sections 70 would preferably include ramp struts 72 made of tubular steel, the ramp collar 77 made of steel pipe, and the ramp cross-support members 73 and linear ramp extension 80 made of angle iron, with the rear axial slide rail member 60 also made of durable angle iron and welded securely to the rear end 102 of the cargo bed 100 with a plurality of lower anchors 65 for additional support.

As indicated in FIG. 3, the L-shaped bracket 90 is illustrated as further defining a base section 92, with a vertical section 94 being shown as an upright extension from the base section 92. In the vertical section 94, a lock aperture 95 is shown to both secure the ramps in place during transportation in the side panel position and also to provide a location for a lock to be applied to prevent theft of the ramps while the swinging cargo ramp assembly is left unattended.

The swinging cargo ramp assembly 10 requires limited applied force in moving the each independent ramp section from the side panel position to the ramp position, utilizing the following steps. Each ramp sections 70 would be unlocked or unsecured from the respective L-shaped brackets 90. Each ramp section 70, which is in a horizontal side position is lifted from the L-shaped bracket 90, the ramp collar 77 being elevated slightly from the ramp shaft extension 56. The ramp section is then released and lowered back onto the ramp shaft extension 56. Each ramp section is then rotated in a horizontal plane, which requires rotation of the upright cylindrical collar 42 about the shaft 32 of the vertical support member 30, shifting the direction of the lateral pivot extension 45 of the horizontal pivot member 40 from the side panel position of pointing forward to the front of the cargo bed 100, to pointing in the opposite direction behind the rear end 102 of the cargo bed 100, as demonstrated in FIG. 2B. At this point, the extension collar 52 of the vertical pivot member 50 is rotated from a vertical position to a horizontal position about the lateral pivot extension 45, FIG. 2C, with rotation directed towards the middle of the cargo bed 100, engaging the ramp side rail claw 84 within the rear axial slide rail member 60. Each ramp section 70 may then be slid along a horizontal axis across the rear end 102 of the cargo bed 100 until the two ramp sections 70 are positioned at a desired location to unload the cargo from the cargo bed. Returning the ramp sections 70 to a side panel position from the ramp position would entail the opposite series of steps.

The ramp sections 70 are provided to allow the unloading and loading of an object having one or more axial wheels aligned in tandem, but may also be used to load and unload an object having a single wheel, by example a wheelbarrow, or a two wheeled vehicle with the wheels aligned, by example a motorcycle, by the deployment of a single ramp instead of both ramps.

In addition to the side panel position, in which the ramp sections 70 are not being used as ramps, a tailgate position is provided as a third position option. In this position, the ramp sections 70 may be of a length that each ramp would be half or more of the width of the cargo bed, and they may be located across the cargo bed in a vertical position. To hold them in place across the cargo bed, a simple chain can be used which may be locked to restrict opening of the ramps, now being utilized as a cargo bed tailgate, to prevent them from being used as ramps and also to restrict access to the cargo bed to remove the objects being transported in the cargo bed. Additional components may accompany this tailgate position, not shown, including cargo bed stops, ramp locking pins, or other objects to lock or hold the ramps in the tailgate position.

While the swinging cargo ramp assembly has been particularly shown and described with reference to a preferred embodiment thereof, it will be understood by those skilled in the art that changes in form and detail may be made therein without departing from the spirit and scope of the invention.

What is claimed is:

1. A swinging cargo ramp assembly integrated within a rear end of a cargo bed of a trailer or vehicle providing a pair of pivotally attached adjustable cargo ramps independently movable from a stored side panel position to an angled ramp position at said rear end of said cargo bed, said swinging cargo ramp assembly having two independent sets of component segments, each said component set comprising:

a rear trailer tab base defining an upper surface and a tab edge horizontally secured to a rear side frame of said cargo bed, a static vertical support member defining a cylindrical vertical shaft having a lower end secured to said upper surface of said tab base and an upper end, and an upper shaft cap, a horizontal pivot member defining an upright cylindrical collar with a vertical bore pivotally installing upon said vertical shaft of said vertical support member, said upright cylindrical collar further defining an outer surface from which a first end of a cylindrical lateral pivot extension depends, said lateral pivot extension having an end cap, a vertical pivot member defining a cylindrical extension collar with a horizontal bore pivotally engaging said lateral pivot extension of said horizontal pivot member between said end cap and said upright cylindrical collar, said extension collar further defining an outer surface to which a lower end of a cylindrical ramp shaft extension is attached, said ramp shaft extension terminating an upper end, a rear axial slide rail member providing a base section attached to said rear end of said cargo bed below a floor of said cargo bed and an upright flange, and a ramp section providing a rigid angled platform with static support during loading and unloading from said cargo bed, said ramp section defining an upper ramp surface, a distal end and a proximal end further defining a cylindrical ramp collar having an outer surface and a ramp collar bore, said ramp collar bore slidably and pivotally installed upon said ramp shaft extension of said vertical pivot member, said ramp collar attaching a ramp extension base of a linear ramp extension, said ramp extension further forming a ramp slide rail claw which will engage said upright flange of said axial slide rail member when said ramps are placed into said angled ramp position behind said cargo bed.

2. The swinging cargo ramp assembly as disclosed in claim 1, further comprising:

said vertical shaft of vertical support member defining an upper end having an upper bearing and a lower end having a lower bearing between which said upright cylindrical collar of said horizontal pivot member is rotatably captured; and said lateral pivot extension having a second end providing an extension bearing which captures said cylindrical extension collar of said vertical pivot member between said extension bearing and said outer surface of said upright cylindrical collar.

3. The swinging cargo ramp assembly as disclosed in claim 1, further comprising:

said vertical shaft of vertical support member defining an upper end having an upper bearing and a lower end having a lower bearing between which said upright cylindrical collar of said horizontal pivot member is rotatably captured; and said lateral pivot extension having a second end providing an extension bearing which captures said cylindrical extension collar of said vertical pivot member between said extension bearing and said outer surface of said upright cylindrical collar, wherein a restricted engagement is provided between said respective collars and shafts or respective collar and cylindrical extension allowing only rotational movement without linear sliding with the sole exception to the linear movement restriction being a sliding linear movement capability between said ramp shaft extension and said ramp collar.

4. The swinging cargo ramp assembly as disclosed in claim 1, further comprising a pair of side panel L-shaped brackets attaching to a respective side frame of said cargo bed to independently retain each respective ramp section in said side panel position during transport or non-use of said ramp sections as ramps.

5. The swinging cargo ramp assembly as disclosed in claim 1, further comprising a pair of side panel L-shaped brackets, each said L-shaped bracket defining a base section, with a vertical section presenting an upright extension from said base section, said vertical section including a lock aperture securing said ramps in place during transportation in said side panel position and also to providing a means to prevent theft of said ramps while said swinging cargo ramp assembly is left unattended.

6. The swinging cargo ramp assembly as disclosed in claim 1, each said ramp section further comprising at least two parallel ramp struts supported by a plurality of ramp cross-support members.

7. A swinging cargo ramp assembly integrated within a rear end of a cargo bed of a trailer or vehicle providing a pair of pivotally attached adjustable cargo ramps independently movable from a stored side panel position to an angled ramp position at said rear end of said cargo bed, said swinging cargo ramp assembly providing two independent sets of component segments, each said component segment comprising:

a rear trailer tab base defining an upper surface and a tab edge horizontally secured to said rear side frame of said cargo bed, a static vertical support member defining a cylindrical vertical shaft having a lower end secured to said upper surface of said tab base and an upper end, said lower end providing a lower shaft bearing, said upper end providing an upper shaft bearing, and an upper shaft cap, a horizontal pivot member defining an upright cylindrical collar with a vertical bore pivotally installing upon said vertical shaft of said vertical support member between said upper shaft bearing and said lower shaft bearing, said upright cylindrical collar further defining an outer surface from which a first end of a cylindrical lateral pivot extension depends, said lateral pivot extension having a second end providing an extension bearing and an end cap, a vertical pivot member defining a cylindrical extension collar with a horizontal bore pivotally engaging said lateral pivot extension of said horizontal pivot member between said extension bearing and said upright cylindrical collar, said extension collar further defining an outer surface to which a lower end of a cylindrical ramp shaft extension is attached, said ramp shaft extension terminating at an upper end, a rear axial slide rail member providing a base section attached to said rear end of said cargo bed below a floor of said cargo bed and an upright flange, and a ramp section providing a rigid angled platform defining at least two parallel ramp struts supported by a plurality of ramp cross-support members, a distal end and a proximal end forming a cylindrical ramp collar having an outer surface and a ramp collar bore, said ramp collar bore slidably and pivotally installed upon said ramp shaft extension of said vertical pivot member, said ramp collar attaching a ramp extension base of a linear ramp extension, said ramp extension further forming a ramp slide rail claw which will engage said upright flange of said axial slide rail member when said ramps are placed into said angled ramp position behind said cargo bed.

8. The swinging cargo ramp assembly as disclosed in claim 7, wherein a restrict engagement is provided between said respective collars and shafts or respective collar and cylindrical extension allowing only rotational movement without linear sliding with sole exception to linear movement restriction being a sliding linear movement capability between said ramp shaft extension and said ramp collar.

9. The swinging cargo ramp assembly as disclosed in claim 7, further comprising a pair of side panel L-shaped brackets attaching to a respective side frame of said cargo bed to independently retain each respective ramp section in said side panel position during transport or non-use of said ramp sections as ramps.

10. The swinging cargo ramp assembly as disclosed in claim 7, further comprising a pair of side panel L-shaped brackets, each said L-shaped bracket defining a base section, with a vertical section presenting an upright extension from said base section, said vertical section including a lock aperture securing said ramps in place during transportation in said side panel position and also to providing a means to prevent theft of said ramps while said swinging cargo ramp assembly is left unattended.

* * * * *